United States Patent [19]
Graf et al.

[11] Patent Number: 6,026,342
[45] Date of Patent: Feb. 15, 2000

[54] CONTROL UNIT FOR A MOTOR VEHICLE

[75] Inventors: Friedrich Graf, Regensburg; Joachim Schäfer, Rain; Kai Storjohann, Regensburg Grass; Michael Ulm, Alteglofsheim, all of Germany

[73] Assignee: Siemens Aktiengesellschaft, Munich, Germany

[21] Appl. No.: 08/762,771

[22] Filed: Dec. 10, 1996

Related U.S. Application Data

[63] Continuation of application No. PCT/DE95/00737, Jun. 6, 1995.

[30] Foreign Application Priority Data

Jun. 10, 1994 [DE] Germany .............................. 44 20 433

[51] Int. Cl.⁷ ..................................................... B60K 41/04
[52] U.S. Cl. ................................. 701/51; 701/54; 701/57; 477/34; 477/107
[58] Field of Search .................................. 701/29, 31, 33, 701/51, 53, 54, 55–58, 60, 61, 65; 477/34, 99, 101, 107, 109, 110, 111, 115

[56] References Cited

U.S. PATENT DOCUMENTS

| | | | |
|---|---|---|---|
| 4,703,428 | 10/1987 | Hosaka et al. | 701/54 |
| 4,945,481 | 7/1990 | Iwatsuki et al. | 701/54 |
| 5,189,617 | 2/1993 | Shiraishi | 701/1 |
| 5,305,213 | 4/1994 | Boardman et al. | 701/54 |
| 5,307,270 | 4/1994 | Graf | 701/54 |
| 5,369,581 | 11/1994 | Ohsuga et al. | 701/35 |

FOREIGN PATENT DOCUMENTS

| | | |
|---|---|---|
| 0 425 199 | 5/1991 | European Pat. Off. . |
| 0 529 117 | 3/1993 | European Pat. Off. . |
| 95/05951 | 3/1995 | WIPO . |

*Primary Examiner*—William A. Cuchlinski, Jr.
*Assistant Examiner*—Edward Pipala
*Attorney, Agent, or Firm*—Herbert L. Lerner; Laurence A. Greenberg

[57] ABSTRACT

A control unit includes a transmission control unit and an engine control unit which are connected to one another through a communication channel. Functional units of the transmission control unit which are dependent on data from the engine and the chassis of the motor vehicle, so-called engine-specific and chassis-specific functional units, are integrated into the engine control unit. Functional units performing an operation that is dependent on data from the transmission, so-called transmission-specific components, are contained in a computer-controlled transmission ratio changing device. Data which are necessary for controlling the transmission, data for selecting or determining the transmission ratio of the transmission and configuration parameters for adapting the control unit to the respective motor vehicle, are exchanged between the engine control unit and the transmission ratio changing device through the communication channel. A shift-point selection control unit, which may be constructed as a fuzzy control unit, is contained in the engine control unit.

10 Claims, 2 Drawing Sheets

CONTROL UNIT FOR A MOTOR VEHICLE

CROSS-REFERENCE TO RELATED APPLICATION

This application is a Continuation of International Application Serial No. PCT/DE95/00737, filed Jun. 6, 1995.

BACKGROUND OF THE INVENTION

Field of the Invention

The invention relates to a control unit for a motor vehicle having an automatic transmission, including a transmission control unit and an engine control unit which are connected to one another by a communication channel through which data bringing about a reduction in engine torque when the transmission ratio of the transmission is modified, are transferred from the transmission control unit to the engine control unit.

Such control units in a motor vehicle with an automatic transmission include an engine control unit and a transmission control unit. They are available in different constructions.

In a known integrated control unit for the automatic transmission and the engine of a motor vehicle, the transmission is controlled by an independent control device which is separate from the engine control unit (as disclosed in U.S. Pat. No. 4,945,489).

In a step-by-step variable speed transmission, a transmission control unit essentially has to carry out the following functions:

a gear-shift control which ensures a gentle and abrasion-free engagement of the individual gears;

a control of the converter lockup clutch;

a gear-shift logic which determines the gear to be respectively engaged;

self-testing; and basic functions such as, for example, input and output functions.

In the case of an infinitely variable speed transmission, a transmission control unit has to carry out the following functions:

regulation of a desired transmission ratio;

control of a starting-up clutch and a converter lockup;

calculation of the desired transmission ratio;

execution of self-testing; and control of basic functions.

In order to ensure that identical terms can be used below for a step-by-step variable speed transmission and for an infinitely variable speed transmission, the gear-shift control of a step-by-step variable speed transmission and the regulation of the desired transmission ratio in the case of an infinitely variable speed transmission are referred to uniformly as shift control; and the switching logic of a step-by-step variable speed transmission and the calculation of the desired transmission ratio in the case of an infinitely variable speed transmission are referred to uniformly as transmission ratio selection.

Since the shift control has to be configured in a transmission-specific way while the configuration of the transmission ratio selection depends, inter alia, on data from the engine and from the chassis of the motor vehicle, a large number of different variants of the control unit for the various types of motor vehicle results. Furthermore, the expenditure for the cable harness between the transmission control unit and the various valves and sensors in the transmission is extremely high.

SUMMARY OF THE INVENTION

It is accordingly an object of the invention to provide a control unit for a motor vehicle, which overcomes the hereinafore-mentioned disadvantages of the heretofore-known devices of this general type and which reduces the number of necessary variants of the control unit.

With the foregoing and other objects in view there is provided, in accordance with the invention, in a motor vehicle having an engine, an automatic transmission and a chassis, a control unit, comprising a transmission control unit; an engine control unit; a communication channel connected between the transmission control unit and the engine control unit for transferring data from the transmission control unit to the engine control unit to bring about a reduction in engine torque when a transmission ratio of the transmission is modified; the transmission control unit having functional units integrated in the engine control unit and dependent on data from the engine and from the chassis of the motor vehicle; a computer-controlled transmission ratio changing device of the transmission having functional units integrated therein and dependent on data from the transmission; and the communication channel exchanging data and configuration parameters used for selection of the transmission ratio between the engine control unit and the transmission ratio changing device.

In accordance with another feature of the invention, there is provided a transmission ratio selection control unit contained in the engine control unit.

In accordance with a further feature of the invention, there are provided circuit devices contained in the engine control unit, for classifying handling characteristics of a driver, evaluating a route on which the motor vehicle is traveling and executing a dynamic transmission ratio correction.

In accordance with an added feature of the invention, the communication channel transfers data relating to an actual engine torque, a desired transmission ratio of the transmission, a desired slip of a converter lockup clutch and a reduction of the actual engine torque, from the engine control unit to the transmission ratio changing device.

In accordance with an additional feature of the invention, the communication channel transfers data relating to an acceptance of a desired transmission ratio of the transmission, an actual transmission ratio of the transmission, an actual slip of a converter lockup clutch and a desired torque reduction, from the transmission ratio changing device to the engine control unit.

In accordance with yet another feature of the invention, the communication channel transfers data relating to faults and functional restrictions of the transmission ratio changing device, relating to a transmission temperature, relating to a converter amplification and relating to a position of a gear-shift lever, from the transmission ratio changing device to the engine control unit.

In accordance with yet a further feature of the invention, the communication channel transfers parameters of the motor vehicle from the engine control unit to the transmission ratio changing device when ignition is switched on, the parameters relating to a reduced moment of mass inertia at an output of the transmission, a mass of the motor vehicle and a wheel size.

In accordance with yet an added feature of the invention, the transmission is a step-by-step variable speed transmission, and the communication channel transfers transmission parameters from the transmission ratio changing device to the engine control unit when ignition is switched on, the parameters relating to a number of gears, transmission ratios of the gears, data regarding a torque converter and types of shifting.

In accordance with yet an additional feature of the invention, the transmission is an infinitely variable speed transmission, and the communication channel transfers transmission parameters from the transmission ratio changing device to the engine control unit when ignition is switched on, the parameters relating to a minimum transmission ratio, a maximum transmission ratio and a nominal rate of change of the transmission ratio.

In accordance with a concomitant feature of the invention, the transmission ratio selection control unit contains a fuzzy logic control unit.

The advantages of the invention lie in particular in the fact that the expenditure on the cabling and the communication in the motor vehicle is significantly reduced. The chassis-specific and engine-specific functions of the transmission control unit are contained in the engine control unit, while the purely transmission-specific functions are contained in a computer-controlled transmission ratio selection unit. The latter constitutes an "intelligent" actuator which is completely tested at the transmission manufacturer's premises. This provides a considerable logistical advantage.

Other features which are considered as characteristic for the invention are set forth in the appended claims.

Although the invention is illustrated and described herein as embodied in a control unit for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
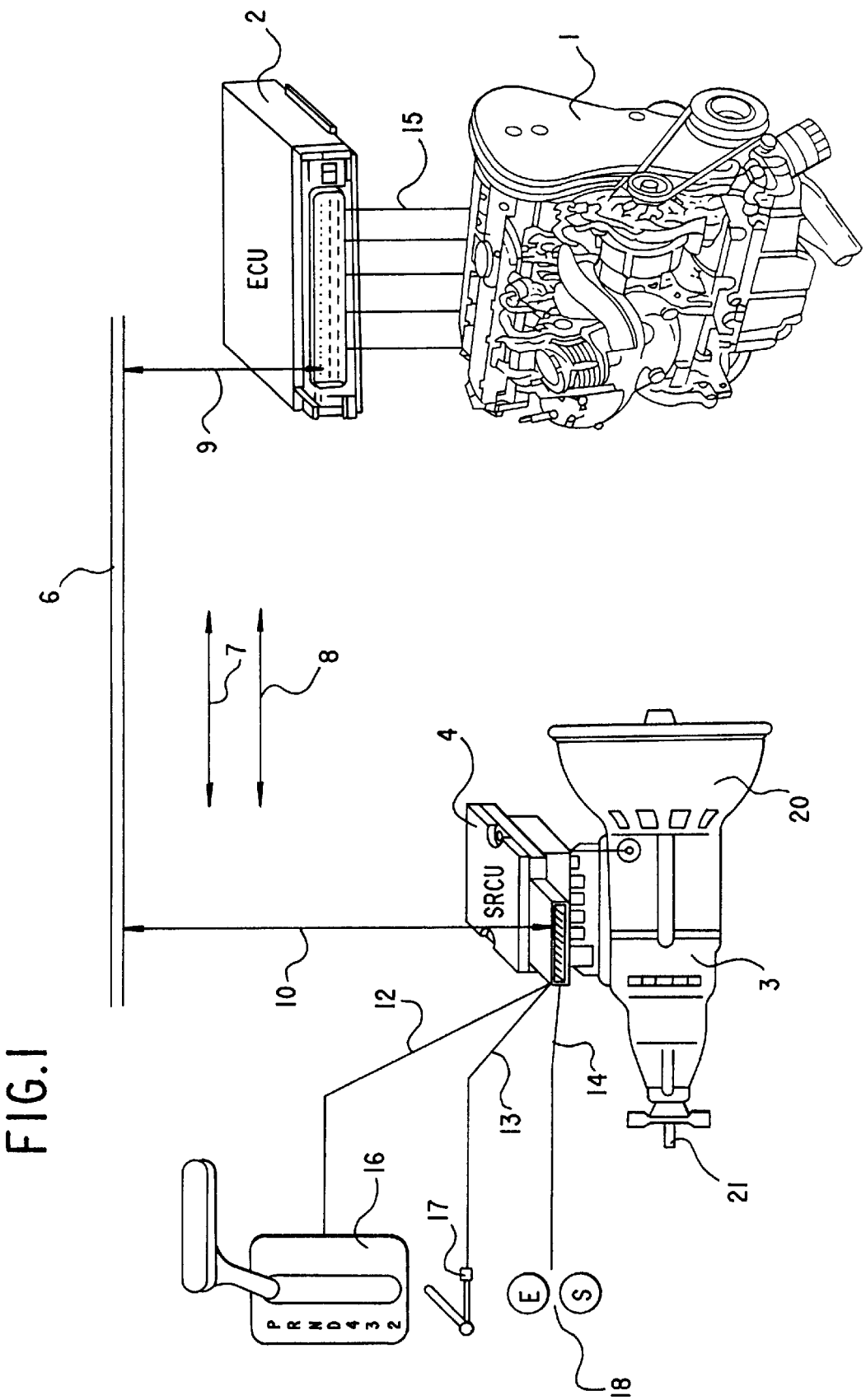
FIG. 1 is a schematic and diagrammatic view of significant components of a motor vehicle drive which is provided with a control unit according to the invention.

Referring now to the figures of the drawings in detail and first, particularly, to FIG. 1 thereof, there is seen an engine 1 which is controlled by an engine control unit 2, and a transmission 3 which is controlled by a transmission ratio selection unit 4. The engine control unit 2 and the transmission ratio selection unit 4 are connected through the use of a communication channel 6 which is realized, for example, as a CAN bus. This bus is only illustrated herein schematically, but it is generally known and described in a large number of publications.

There is an exchange between the engine control unit 2 and the transmission ratio selection unit 4, firstly of data which are used for the selection of the transmission ratio and are indicated by an arrow 7, and secondly of configuration parameters which are used for the adaptation to the respective motor vehicle and are indicated by an arrow 8. Examples of the data transmitted through the communication channel 6 are given below.

The bidirectional connection of the engine control unit 2 to the communication channel 6 is indicated schematically by a line 9 and the likewise bidirectional connection of the transmission ratio selection unit 4 to the communication channel 6 is indicated by a line 10.

A gear-shift lever 16, a kickdown switch 17 and a travel program selection switch 18 are connected to the transmission ratio selection unit 4 through the use of respective signal lines 12, 13 and 14. Through the use of these control elements 16, 17, 18, the driver enters his or her instructions or wishes into the transmission ratio selection unit 4 as follows: The desired shift setting P, R, N, D, 4, 3 or 2 in the case of a step-by-step variable speed transmission or P, R, N or D in the case of an infinitely variable speed transmission, is entered through the gear-shift lever 16 in a known manner. The request for strong acceleration is entered through the kickdown switch 17. The selection between an "economy" and a "sporty" travel program is entered through the travel program selection switch 18. The engine 1 is connected to the engine control unit 2 through the use of control and signal lines 15. Sensor signals relating to the rotational speed of the engine, the temperature of the engine and other known operating parameters are transmitted from the engine 1 to the engine control unit 2 through these signal lines, and from there instructions for controlling the ignition, the fuel injection quantity, the ignition time and, if appropriate, other known engine parameters are transferred to the engine 1 through these signal lines.

The engine 1 and the transmission 3 are represented separately in this case for the sake of better clarity, but it is generally known that the output shaft of the engine 1 is connected directly to a starting-up element 20, for example a torque converter, of the transmission 3. Correspondingly, an output shaft 21 is also connected to the output train of the motor vehicle. The chassis, the wheel suspensions, the wheels and further components of the motor vehicle are not illustrated herein since they are not affected by the invention and are generally known.

Figure 2:
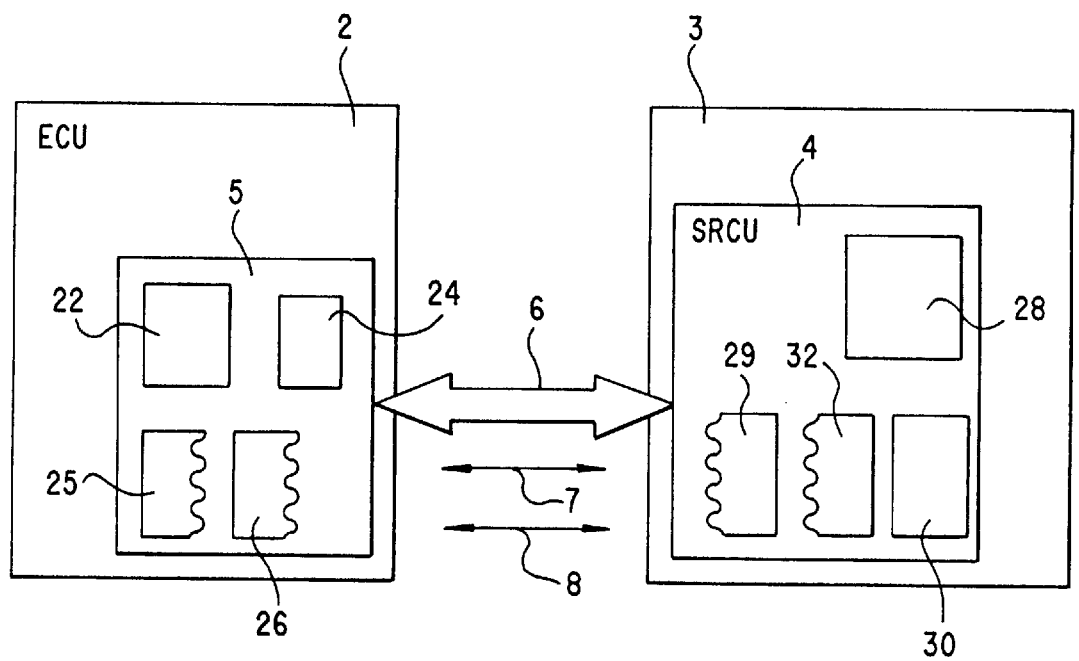
FIG. 2 is a block diagram of the control unit of the drive according to FIG. 1.

FIG. 2 shows some of the functional units of a transmission control unit combined under reference numeral 5 which are chassis-specific or engine-specific, i.e. which depend on data from the engine and from the chassis of the motor vehicle and which are integrated into the engine control unit 2: a transmission ratio selection unit circuit device 22, a driver or handling-characteristics classification unit circuit device 24, a testing circuit 25 and basic modules 26 which, for example, execute data input and output procedures. The transmission ratio selection unit 22 may be constructed as a fuzzy control unit and, in this case, may also contain the functions of driver or handling-characteristics classification, route evaluation and dynamic shift-point correction (as disclosed in Published European Patent Application 0 622 570).

The computer-controlled transmission ratio selection unit 4, which is also referred to as SRCU (Smart Ratio Change Unit), contains essentially only functional units that are dependent on data from the transmission. These are a transmission ratio changing control unit 28, a testing circuit 29 for the actuators, a control unit 30 of the starting-up element 20 and basic modules 32 which, for example, process signals from known sensors near the transmission, for example from rotational speed sensors in the transmission, from temperature sensors and from hydraulic pressure sensors in the transmission, etc.

The transmission ratio selection unit 4 is constructed in such a way that only minimum chassis-dependent and engine-dependent parameterization of its functions is necessary, i.e. it only needs to contain a very small amount of data from the chassis and from the engine of the respective motor vehicle. The expenditure on cabling between the engine control unit, the transmission ratio selection unit and the sensors and actuators, which are not illustrated herein since they are generally known and are not changed by the invention, is greatly reduced by dividing the functions between the engine control unit and the transmission ratio selection unit.

The transmission ratio selection unit 4 is directly attached to the housing of the transmission 3 or accommodated in that housing. It is supplied by the manufacturer together with the transmission as one unit.

Status variables Z and control variables S are exchanged between the engine control unit (ECU) 2 and the transmission ratio selection unit (SRCU) 4 through the communication channel 6. An example of the data to be exchanged is illustrated in the following table. In the table, reference symbol CC signifies a converter lockup clutch of the transmission used in the exemplary embodiment.

| ECU to SRCU | | SRCU to ECU |
|---|---|---|
| $T_{eng,act}$ (actual engine torque) | Z | |
| $TR_{des}$ (desired transmission ratio) | S | $TR_{des,o.k.}$ (acceptance of desired transmission ratio) |
| | | $TR_{act}$ (actual transmission ratio) |
| CC $slip_{des}$ (desired CC slip) | S | CC $slip_{act}$ (actual CC slip) |
| | | Fault status of the SRCU |
| | | Malfunctioning of the SRCU |
| | | Functional restriction of the SCRU |
| $T_{red,act}$ (actual torque reduction) | Z | $T_{red,des}$ (desired torque reduction) |
| | | Transmission temperature |
| | | Converter amplification |
| | | Position of gear-shift lever |

In addition to such an exchange of data, parameters, which are necessary for controlling the transmission ratio changing process, can also be exchanged between the engine control unit 2 and the transmission ratio selection unit 4 through the communication channel 6. These parameters are expediently transmitted as physical units. An example of parameters to be transmitted is illustrated in a table on page 14.

The acceptable transmission ratio changes which are dependent on the respective transmission are referred to below as types of shift. Thus, for example, shifting down from fifth into first or second, sometimes even into third, gear is not permitted with a large number of transmissions.

This results in the following advantages: the transmission ratio selection unit 4 requires only a minimum of engine-specific and chassis-specific data. It is completely independent of data from the engine and from the chassis. Only a minimum of transmission-specific data is required in the engine control unit 2. The result of this is that the transmission ratio selection unit does not have to be adapted to different variants of engine and chassis during manufacture.

| ECU to SRCU | SRCU to ECU |
|---|---|
| Moment of mass inertia | Number of gears (in step-by-step variable speed transmissions) |
| Mass of vehicle | Transmission ratios (in step-by-step variable speed transmissions) |
| Wheel size | Types of shift (in step-by-step variable speed transmissions) |
| | Minimum transmission ratio (in infinitely variable speed transmissions) |
| | Maximum transmission ratio (in infinitely variable speed transmissions) |
| | Nominal rate of change of transmission ratio (in infinitely variable speed transmissions) |

The microprocessor or computer, which is not illustrated herein since they are generally known, but which is contained in the transmission ratio selection unit, ensures that adaptation is executed on the basis of transmitted engine and chassis parameters. Another possibility is to store data sets for the various variants of vehicles in the transmission ratio selection unit 4 and in each case to activate the data set of one of these variants through the use of a code word which is transmitted to the transmission ratio selection unit 4 through the communication channel 6.

In addition to transferring physical parameters, status variables and control variables, identification information can also be exchanged between the engine control unit and the transmission ratio selection unit. This permits the following to be achieved.

If components are replaced, for example within the scope of repairs, there is provision for the components to exchange identification data through the communication channel 6. Such identification data are variant-specific, i.e. they identify the type of motor vehicle for which the respective component is suitable. Thus, the other components or control devices are able to determine whether or not they are capable of functioning with one another. In this way, for example, it is detected if a transmission which is unsuitable for the motor vehicle has been inadvertently installed.

Furthermore, this exchange of control device-specific identification data makes it possible to prevent an unauthorized replacement of components or devices. As a result, for example, a repair by non-authorized workshops and in particular an installation of stolen devices in a motor vehicle or of replacement components in a stolen motor vehicle, can be effectively prevented. Thus, improved protection against theft is also achieved.

We claim:

1. In a motor vehicle having an engine, an automatic transmission and a chassis, a control unit, comprising:
   a computer-controlled transmission ratio changing device;
   an engine control unit;
   a communication channel connected between said computer-controlled transmission ratio changing device and said engine control unit for transferring data from said computer-controlled transmission ratio changing device to said engine control unit to bring about a reduction in engine torque when a transmission ratio of the transmission is modified;
   a transmission control unit having functional units integrated in said engine control unit and dependent on data from the engine and from the chassis of the motor vehicle;

said computer-controlled transmission ratio changing device of the transmission having functional units integrated therein and dependent on data from the transmission; and said communication channel exchanging data and configuration parameters used for selection of the transmission ratio between said engine control unit and said transmission ratio changing device.

2. The control unit according to claim 1, including a transmission ratio selection control unit contained in said engine control unit.

3. The control unit according to claim 1, including circuit devices contained in said engine control unit, for classifying handling characteristics of a driver, evaluating a route on which the motor vehicle is traveling and executing a dynamic transmission ratio correction.

4. The control unit according to claim 1, wherein said communication channel transfers data relating to an actual engine torque, a desired transmission ratio of the transmission, a desired slip of a converter lockup clutch and a reduction of the actual engine torque, from said engine control unit to said transmission ratio changing device.

5. The control unit according to claim 1, wherein said communication channel transfers data relating to an acceptance of a desired transmission ratio of the transmission, an actual transmission ratio of the transmission, an actual slip of a converter lockup clutch and a desired torque reduction, from said transmission ratio changing device to said engine control unit.

6. The control unit according to claim 1, wherein said communication channel transfers data relating to faults and functional restrictions of said transmission ratio changing device, relating to a transmission temperature, relating to a converter amplification and relating to a position of a gear-shift lever, from said transmission ratio changing device to said engine control unit.

7. The control unit according to claim 1, wherein said communication channel transfers parameters of the motor vehicle from said engine control unit to said transmission ratio changing device when ignition is switched on, the parameters relating to a reduced moment of mass inertia at an output of the transmission, a mass of the motor vehicle and a wheel size.

8. The control unit according to claim 1, wherein the transmission is a step-by-step variable speed transmission, and said communication channel transfers transmission parameters from said transmission ratio changing device to said engine control unit when ignition is switched on, the parameters relating to a number of gears, transmission ratios of the gears, data regarding a torque converter and types of shifting.

9. The control unit according to claim 1, wherein the transmission is an infinitely variable speed transmission, and said communication channel transfers transmission parameters from said transmission ratio changing device to said engine control unit when ignition is switched on, the parameters relating to a minimum transmission ratio, a maximum transmission ratio and a nominal rate of change of the transmission ratio.

10. The control unit according to claim 2, wherein said transmission ratio selection control unit contains a fuzzy logic control unit.

* * * * *